United States Patent
Anderson et al.

[11] Patent Number: 5,897,679
[45] Date of Patent: Apr. 27, 1999

[54] DIMENSIONAL CONTROL IN THE MANUFACTURE OF OPTICAL FIBER FERRULE CONNECTORS BY ETCHING

[75] Inventors: Jerry Max Anderson, Austell, Ga.; Aza E. Mishkevich, Bridgewater; Eliezer M. Rabinovich, Berkeley Heights, both of N.J.

[73] Assignee: Lucent Technologies Inc., Murray Hill, N.J.

[21] Appl. No.: 08/921,648

[22] Filed: Aug. 27, 1997

[51] Int. Cl.$^6$ .................................................. C03B 23/047
[52] U.S. Cl. ........................ 65/382; 65/31; 65/429; 65/393; 65/407; 216/97
[58] Field of Search ............................. 65/404, 407, 31, 65/429, 393, 377, 382; 216/97

[56] References Cited

U.S. PATENT DOCUMENTS

| | | | |
|---|---|---|---|
| 3,317,297 | 5/1967 | Ray | 65/31 |
| 4,042,359 | 8/1977 | Schnabel | 65/31 |
| 4,124,364 | 11/1978 | Dalgoutte | 65/407 |
| 4,228,206 | 10/1980 | Fabisak | 65/31 |
| 4,343,675 | 8/1982 | Anderson | 65/31 |
| 4,597,785 | 7/1986 | Karbassiyoon | 65/382 |
| 4,631,114 | 12/1986 | Schneider | 216/97 |
| 4,767,430 | 8/1988 | Denekel | 65/31 |
| 4,960,316 | 10/1990 | Berkey | 65/407 |
| 5,127,929 | 7/1992 | Günther | 65/429 |
| 5,152,816 | 10/1992 | Berkey | 65/429 |
| 5,192,350 | 3/1993 | Le Sergent | 65/382 |
| 5,240,489 | 8/1993 | Robson | 65/407 |
| 5,570,441 | 10/1996 | Finas | 65/429 |
| 5,598,496 | 1/1997 | Anderson | 385/84 |
| 5,618,326 | 4/1997 | Szebesta | 216/97 |
| 5,676,724 | 10/1997 | Barre | 65/429 |

FOREIGN PATENT DOCUMENTS

| | | | |
|---|---|---|---|
| 598349 | 5/1994 | European Pat. Off. | 65/429 |

*Primary Examiner*—John Hoffmann

[57] ABSTRACT

The specification describes techniques for chemically machining extruded glass preforms used to draw glass ferrules for optical fiber connectors. Using the chemical machining technique the dimensions of the preform, including OD, ID, and the OD to ID ratio can be adjusted so that the dimensions of drawn ferrules meet strict dimensional standards. The technique is especially useful for adjusting the dimensions of extruded preforms that have an inherent bow along in the length of the preform. The technique allows adjustment in dimensions while preserving a desired OD to ID ratio. Also described are techniques for reducing eccentricity and/or ellipticity of hollow bore glass preforms.

19 Claims, 6 Drawing Sheets

FIG. 1 (prior art)
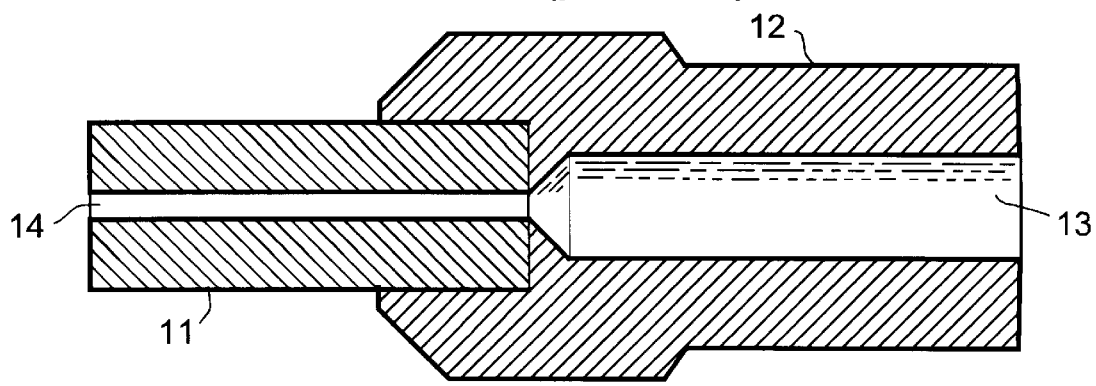
FIG. 2 (prior art)
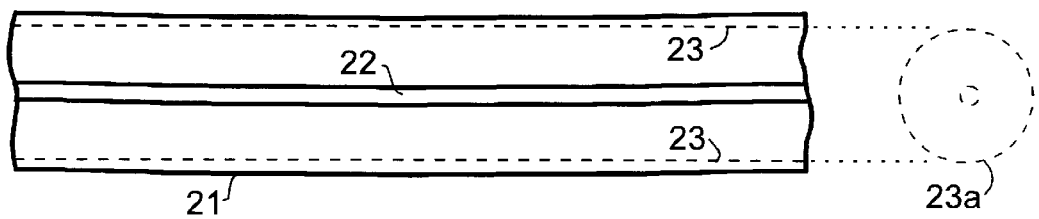
FIG. 3 (prior art)
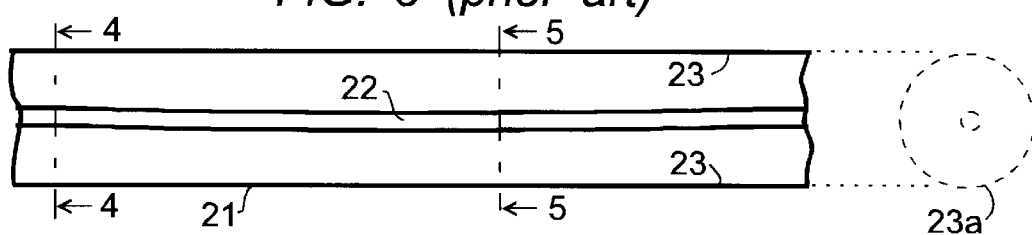
FIG. 4 (prior art)     FIG. 5 (prior art)
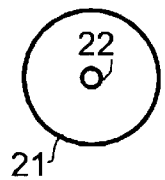 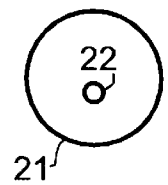

5,897,679

DIMENSIONAL CONTROL IN THE MANUFACTURE OF OPTICAL FIBER FERRULE CONNECTORS BY ETCHING

FIELD OF THE INVENTION

This invention relates to glass ferrules for connecting optical fibers, and to methods for their manufacture.

BACKGROUND OF THE INVENTION

Optical fiber connectors that comprise a glass ferrule are known. See U.S. Pat. No. 4,850,670. However, despite potential cost advantage over conventionally used ceramic ferrules, glass ferrules have found only limited use, e.g., in the so-called rotary splice. This general failure to adopt an otherwise advantageous technology is due at least in part by the failure of many prior art glass ferrules to meet stringent mechanical requirements, including strength and dimensional standards. Indeed, in the rotary splice there is only minimal mechanical stress on the glass ferrule since the rotary splice is designed for one time assembly.

In view of the significant cost savings that can be realized from the replacement of ceramic ferrule optical fiber connectors with relatively inexpensive glass ferrule optical fiber connectors, it would be highly desirable to have available glass ferrules with improved strength that can meet the design standards for current connectors, and also have the dimensional control necessary to meet those standards.

U.S. Pat. No. 5,295,213 discloses a method of strengthening alkali-containing glass ferrules by ion exchange. The ion exchange method applies to borosilicate glass containing 3 to 10 wt. % $Na_2O$, and results in a thin layer of strengthened glass on the outer surface of the glass where the ion exchange process occurs. However, this layer is thin, typically 10–20 $\mu$m, and is easily abraded away in practical service and the ferrule then returns to its original weak state. Moreover, this technique is not applicable to vitreous silica or PYREX™ ferrules. It is well known that glasses with a higher amount of sodium and with a significant amount of alumina are more effective when treated by an ion-exchange process, and we have used such glass compositions, e.g. those described in U.S. Pat. No. 3,661,545 to make ferrules with a strengthened layer 75 $\mu$m thick. This ferrule can survive very harsh abrasion treatment and thermal shock with only moderate loss of the enhanced strength.

Another technique for producing glass ferrules for optical fiber connectors is described and claimed in U.S. Pat. No. 5,598,496. This technique involves etching the outer surface of the glass ferrule to improve the strength of the glass, and coating the etched surface with an adherent coating of, e.g. Ni and Au.

In these and other similar known techniques, glass ferrules are produced from a tubular preform by drawing the preform into a continuous glass tube, and cutting the tube into sections each of which becomes a glass ferrule. Since the early recognition of the potential economies of substituting glass ferrules for ceramic ferrules, a concern about reliability of glass ferrule manufacture has been the dimensional control capabilities of glass making technology as compared with the known dimensional precision inherent in ceramic technology. In practice, it has been found that relatively good dimensional control can be realized with glass ferrule fabrication techniques. This is due to inherent behavior of glass during tube drawing in which the geometry of the preform is replicated to a high degree in the tube, and the success of glass ferrule technology so far has relied on that inherent property. While the replication in the drawn tube is indeed high, the ability to manufacture the starting preforms with precise dimensional control is less assured.

Preforms for these processes may be produced e.g. by extruding large cylindrical hollow bore glass bodies with a relatively large outside diameter, and lengths of e.g. 20" or more. It is found in practice that no two extruded preforms are alike in inside and outside diameter and ratio OD/ID, and some preforms have eccentricity between OD and ID. With such variations in preform manufacture it is difficult to produce drawn glass ferrules with required dimensional standards. For multimode fiber ferrule connectors, dimensional control should be within ±1.5 $\mu$m for OD, and within ±3.0 $\mu$m for ID. For single mode fibers, the precision required is even higher. In terms of the precision required for preform dimensions, for a preform with e.g. a 40 mm OD, to be drawn into 2.5 mm OD ferrules, the OD of the preform should be controlled to within ±24 $\mu$m. The standards for ovality and concentricity are equally stringent.

Efforts have been made to adjust the OD, and bring the OD/ID ratio into compliance with desired limits, by mechanically machining the preform. This is a known technique for adjusting the dimensions of glass preforms, and typically involves removing glass material from the preform using a glass lathe. However, this approach does not allow adjusting the ID of the preform, and is not effective in many cases for correcting eccentricity in hollow bore preforms.

Moreover, in the course of this work it was discovered that almost all of the hollow bore cylindrical preforms produced by one of the glass forming methods, i.e. extrusion, exhibit a slight bowing, typically 0.2–1 mm per 750 mm length (approximately 0.02—0.13%). This bowing occurs is essentially congruent in both the OD and the ID along the length of the hollow bore cylinder. Since the bowing occurs in essentially equal measure in both the OD and the ID, it does not affect the ratio OD/ID in the drawn state and therefore is considered to be within the dimensional tolerance of the process. Thus it is an acceptable defect in conventional practice. However, when the OD is adjusted by machining, typically machining in a glass lathe, the outer bow, or a portion thereof, is removed while the inner bow remains. This produces an eccentricity in the preform (or exacerbates existing eccentricity) which varies axially along the preform. This lack of concentricity is replicated in the drawn state. Any significant offset in the location of the center bore is not acceptable in the drawn ferrule connectors.

A process for making glass ferrules with high dimensional stability, and with the capability of adjusting both the ID and OD of the preform without causing bore eccentricity would be a significant advance in this technology.

STATEMENT OF THE INVENTION

For effective manufacture of glass ferrules with dimensional tolerances required by manufacturing specification, the bowing, as described above, as well as other dimensional irregularities in the preform, must be corrected prior to drawing the ferrule tubes. Having recognized the existence of these defects and importance of their reduction, and the ineffectiveness of mechanical machining the OD of the preform as an approach to dimensional control, we have developed an alternative solution whereby the overall dimensions of a bowed hollow bore preform can be adjusted while preserving concentricity of the hollow bore. The technique preserves the concentricity between the inner and outer preform dimensions along the entire length of the preform rod. The glass in the drawn state then replicates the preform with a concentric hollow bore along the length of the drawn glass body.

In the course of this work, we developed a generic process for dimensional control of hollow bore glass preforms in the manufacture of glass ferrules. In addition to chemically machining the inside and outside diameters of the preform, we found that selective etching can be used to improve the circularity of the preform (i.e. to reduce ellipticity), and to improve the concentricity of the hollow bore in the preform where the bore is initially offset.

BRIEF DESCRIPTION OF THE DRAWING

FIG. 1 shows a typical optical fiber connector employing a glass ferrule component;

FIG. 2 is a schematic diagram of a hollow bore ferrule preform illustrating the bowing problem to which one aspect of the invention is addressed;

FIG. 3 is a schematic diagram showing the preform of FIG. 2 after mechanical machining according to the prior art technique;

FIGS. 4 and 5 are section views through 4—4 and 5—5 of FIG. 3;

BRIEF DESCRIPTION

Figure 6:
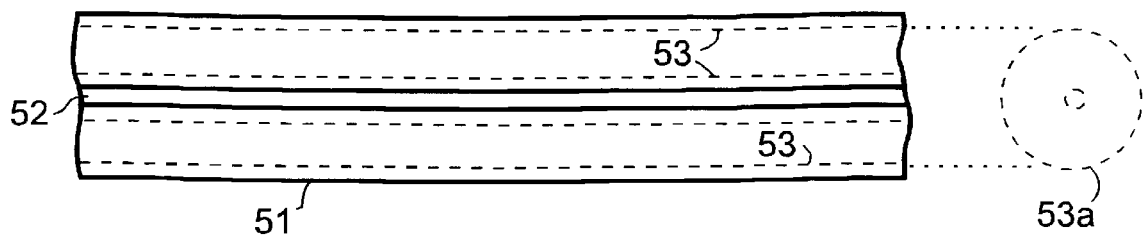
FIG. 6 is a schematic diagram similar to that of FIG. 2 showing with dashed lines the amount of material from the outside and inside to be removed as a result of chemical machining on a ferrule preform according to the invention.

A typical optical fiber connector with a glass ferrule connector component is shown in FIG. 1. The connector comprises glass ferrule 11 with a center bore 14 for the optical fiber (not shown). The ferrule is adapted for insertion into a terminal member 12 which has a center bore 13 for the mating fiber. To accommodate a coated fiber the bore 13 in the terminal member 12 is typically larger than the bore 14 in ferrule 11. Examples of these types of connectors are described in U.S. Pat. Nos. 4,850,670; 5,396,572; 5,295,213 and 4,812,009, all of which are incorporated herein by reference.

It should be understood that the drawings associated with this description are not to scale. For example, the bore in the ferrules and the preforms are exaggerated for clarity.

As mentioned above, glass ferrule components such as 11 in FIG. 1, can be manufactured from a hollow bore preform by drawing the preform into a tube, as described in U.S. Pat. No. 5,295,213, and cutting sections of the drawn tube to form glass ferrules. As is well known the preform has substantially larger dimensions than the drawn tube. Also as described above the dimensional characteristics of the preform determine the geometry and the dimensional precision of the drawn ferrules.

Referring to FIG. 2, a hollow bore preform 21 is shown with hollow bore 22. The ID of the preform is a complex function of the final ferrule od and of conditions of drawing. The id of the ferrule is typically around 0.127 mm. (The convention used here refers to preform dimensions in upper case letters and ferrule dimensions in lower case letters). If, for example, a preform with OD=40 mm is to be reduced to a ferrule with od=2.5 mm, from purely geometrical considerations the ID of the preform should be (40×0.127)/2.5= 2.03 mm. However, drawing results in a partial collapse of the bore (the extent of collapse is established experimentally), and this requires a larger bore in the preform than this simple calculation suggests. The ID is typically in the range of 2.0–2.7 mm for a 2.5 mm ferrule and 4.5–5.5 mm for a 1.25 mm ferrule.

Due to the requirement of a hollow bore, preforms for glass ferrules are typically formed by extrusion using well known glass extrusion techniques. Frequently, preforms produced in this manner exhibit bowing along the length of the preform. A bow in the hollow bore preform is evident in FIG. 2. It is shown as a uniform bow along the preform length, i.e. a single bow without inflection, but the bow in a typical preform may be irregular, i.e may consist of a series of bows of varying degree. It is characteristic of bowed preforms that the bow in the bore closely follows the bow in the outer surface. Consequently, the bow does not affect concentricity. Since the bowing is slight, e.g. up to 1 mm per 700 mm of preform length, ferrules made from drawing a bowed preform show negligible effects of the original preform bow. Therefore, bowed preforms could be routinely used for drawing high quality ferrules if the original OD/ID ratio were within acceptable limits. Unfortunately, this is not the case and the OD/ID of a typical preform should be adjusted prior to drawing.

To adjust the OD/ID ratio, the straightforward approach is to remove material from the outer surface along the dashed line 23 shown in FIG. 2. The bore of the preform is centered, as seen in the end view 23a. Removal of material from the outer surface can be achieved according to prior art methods by machining in a glass lathe.

The effect of mechanical removal of material from the outer surface of a bowed preform is illustrated in FIGS. 3–5. FIG. 3 shows the hollow bore preform 21 after removal of the outer skin, so that the actual outer surface coincides with dashed line 23 (FIG. 2). A cross section 4—4 of the hollow bore preform near the end of the preform is shown in FIG. 4, and the hollow bore appears reasonably centered. However, at other positions along the preform length the bore is significantly off center. This is evident from the section 5—5 shown in FIG. 5.

The asymmetry is addressed according to the invention by chemically machining the hollow bore preform. FIG. 6 represents the preform prior to chemical machining, with perform 51 shown with a bow similar to that of FIG. 1, and with bore 52 centered in the bowed preform. The material to be removed by chemical machining is represented by dashed lines 53, and may include the interior bore 52 (ID) as well as the exterior of preform 51 (OD). Of course the OD/ID ratio is more rapidly adjusted by removing material from the inside but the figures illustrate chemical machining of both the OD and ID to demonstrate the options available using the technique of the invention.

Figure 7:
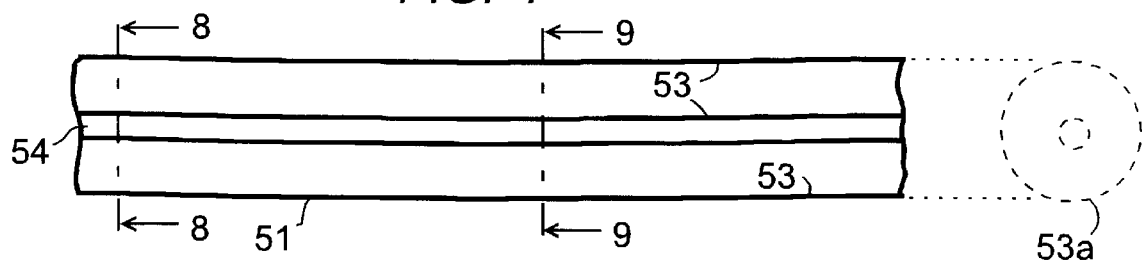
FIG. 7 is a view of the preform of FIG. 6 after chemical machining.
Figure 8:
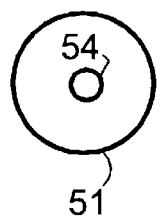
FIGS. 8 and 9 are sections through 8—8 and 9—9 of FIG. 7.
Figure 9:
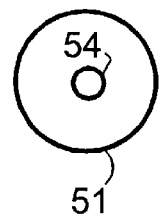

FIG. 7 shows the hollow bore preform after chemical machining, with the material indicated by dashed lines 53 removed. This occurs uniformly along the length of the preform. Both bows and their geometrical similarity are preserved and thus the cross section 8—8 of FIG. 8 is essentially identical to cross section 9—9 of FIG. 9, with both bores concentric, i.e. centered in the preform.

For the purpose of definition, here and in the appended claims, the hollow bore preforms described above can be considered as tubular, even though these diameter are substantially different, i.e. the wall thickness of the tube is large. If, prior to the etching treatment described above the outside diameter of the preform is assigned OD, and the inside diameter $ID_1$, and when, after the etching treatment both of these diameters have changed to $OD_2$ and $ID_2$, the ratio $OD_2/ID_2$ has been decreased from $OD_1/ID_1$. The drawn ferrules also can be considered tubular with $od_f$ and $id_f$, where $od_f/id_f$ is a function of $OD_2/ID_2$ and of drawing conditions.

Also for the purpose of definition, the tubular preforms have a central axis, and the length of the preform is the length measured along that axis, i.e. the axial length L. A bowed preform is one in which the axis of the preform, i.e. the central axis of the tube, is curved.

An example of an apparatus useful for carrying out the processes described above is shown in FIG. 10. Etching tank 61 is shown partially filled with etchant 62. The etchant is typically an HF containing solution, although any suitable glass etchant may be used. Hollow bore preform 63 is supported in the etching tank by rollers 65, with the axial length of the preform horizontal. A pair, or more, of rollers at each end of the preform are sufficient to suspend the preform with at least part of the preform in the etching solution. Means (not shown) are provided to controllably rotate or rock the rollers 65 to ensure etching around the desired portion of the periphery of the preform. Alternatively the entire preform can be immersed in the etching solution. The bore can be stoppered or open. It is preferred to rotate the preform to maintain fresh etchant on all surfaces being etched. It has also been found that intermediate rinses, at e.g. 10–20 minute intervals, are helpful in accelerating the process.

Figure 10:
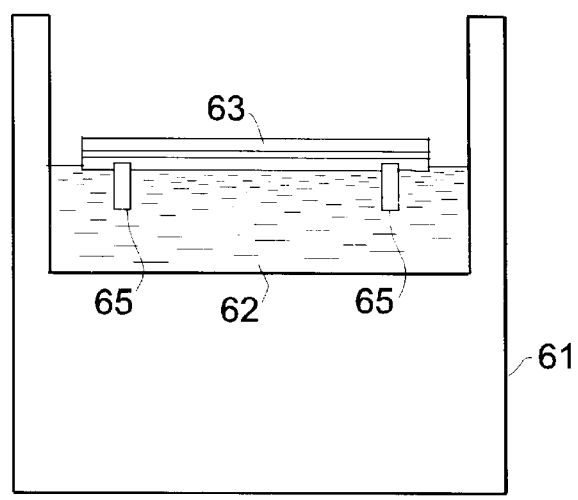
FIG. 10 is a schematic diagram of an apparatus useful for carrying out one embodiment of the process of the invention.

In the etching process shown in FIG. 10 the preform is mounted horizontally, which provides the option of partially immersing the preform as described. If it is desired to completely immerse the preform in the etching solution the preform need not be mounted horizontally but can be mounted with any orientation, e.g. vertically, as will be described later.

Figure 11:
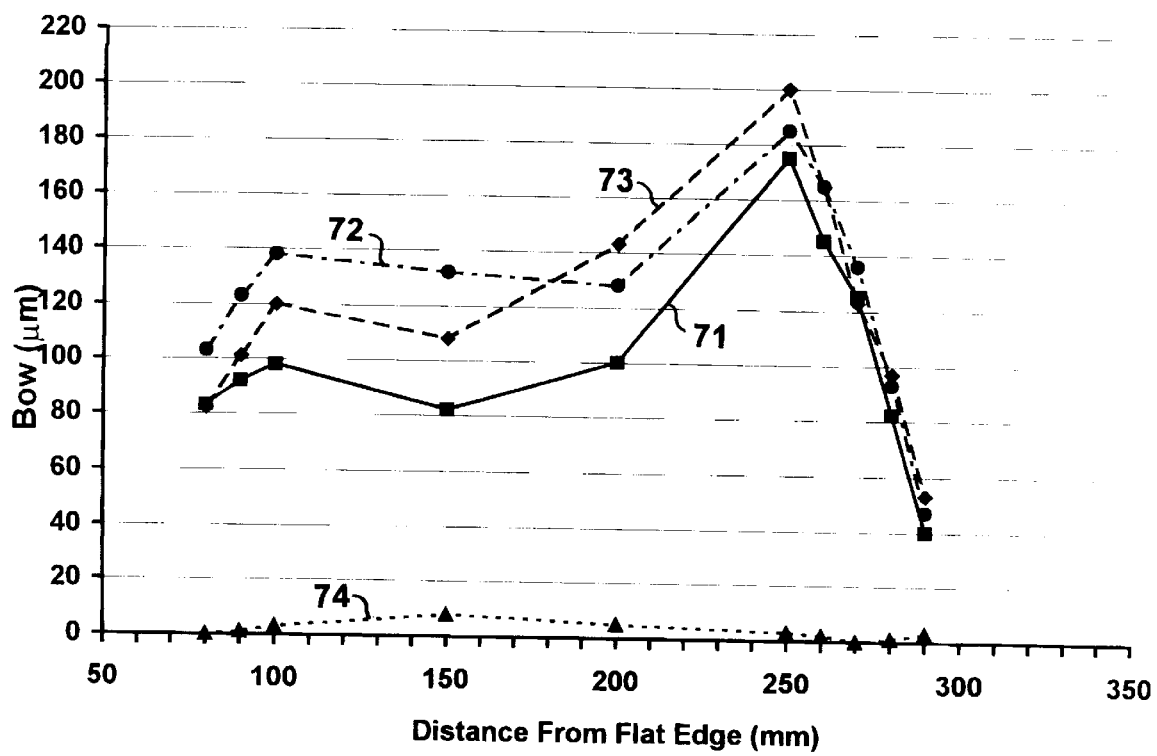
FIG. 11 is a plot showing external and internal bowing in a typical preform before and after mechanical machining.
Figure 12:
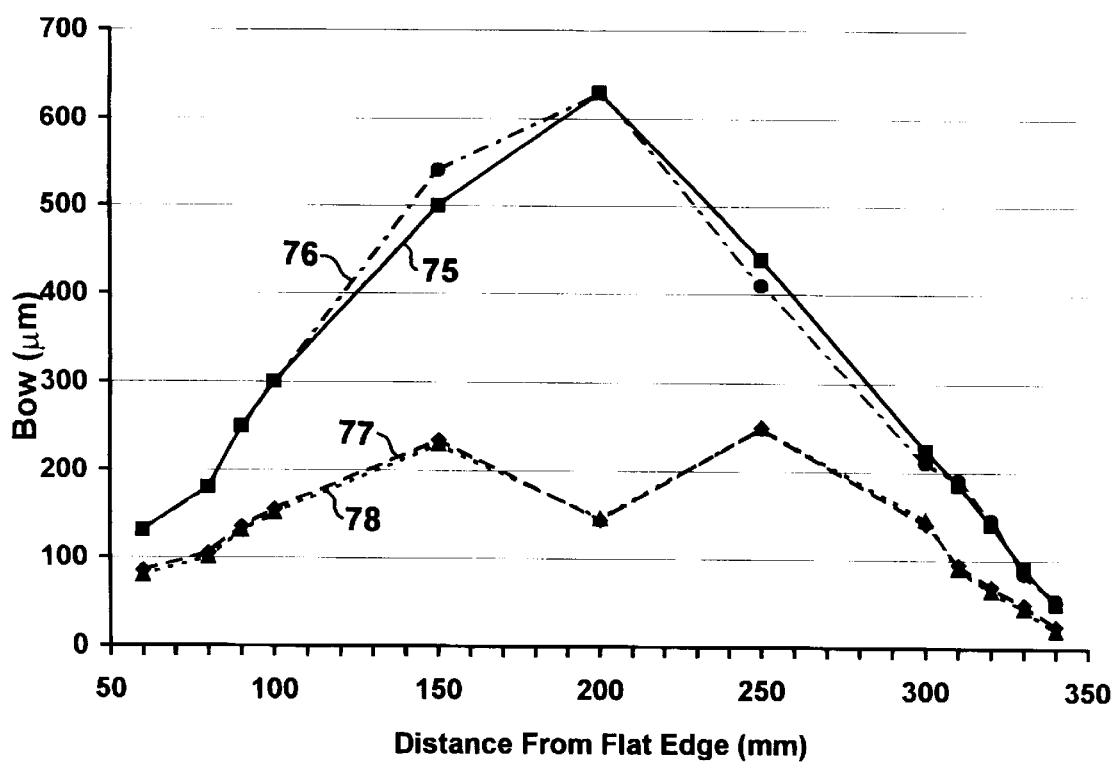
FIG. 12 is a plot showing external and internal bowing of a preform before and after chemical machining according to the invention.

Results of the foregoing technique are shown in FIGS. 11 and 12. FIG. 11 is a plot of the bow in microns (ordinate) vs. the distance in mm along the preform (abscissa) for a typical extruded hollow bore preform. Curve 71 (squares) gives measurements for the outer surface of the preform prior to any treatment and shows the irregular bow along the length of the preform. Curve 72 (circles) shows the bow on the inner surface of the bore prior to treatment and illustrates how the bow in the bore tracks the bow of the outer diameter. After mechanical machining of the outer diameter according to a prior art approach the bow of the bore is shown by curve 73 (downward triangles), which tracks approximately the bow of the bore prior to treatment. The outer diameter however, has been machined significantly, and is represented by curve 74 (upward triangles) which now approximates a straight line. However, though the bow has been substantially removed from the outer diameter, it remains in the inner bore, thus producing the bore eccentricity described in connection with FIG. 5.

The results of chemical machining according to the invention are shown in FIG. 12. As mentioned above, no two extruded preforms have the same shape and the bow of this preform is different from that of FIG. 11. The bow is represented by curve 75 (squares) for the outer surface prior to treatment, and 76 (circles) for the inner bore prior to treatment. These curves essentially coincide as expected. After etching in aqueous $HF/H_2SO_4$ solution for about 5 hr, with frequent intermediate rinses, the OD of the preform was reduced from 37.6 mm to 34.4 mm. The actual measurements of the bow of the outside surface are given by curve 77 (upward triangles) and measurements of the bow of the bore are given by curve 78 (downward triangles). As seen curves 77 and 78 essentially coincide, as described by FIGS. 8 and 9, and they are close to the original curves 75 and 76. Some discrepancy is the result of a non-precise measurement method.

The success of chemical machining for dimensional adjustment of bowed preforms inspired further development of this technique for eliminating or reducing other dimensional defects in hollow bore preforms. The bore occasionally exhibits a minor, essentially monotonic, increase in preform diameter along the length of the preform. The OD may also have irregularities. Using the chemical machining technique of the invention the OD and ID of the preform can be adjusted by selective etching along the preform length. This can be carried out in an apparatus like that shown in FIG. 13. An etching tank 81 is shown with etchant 82. The hollow core preform to be treated is shown at 83. By controlled dipping of the preform into the etchant in a vertical direction, as represented by the arrow, glass material is controllably removed from both the exterior and interior preform surfaces along the preform length.

This chemical machining technique can be used for adjusting selected regions of either the OD or the ID independent of the other, e.g. by plugging the tube to adjust only the OD or by directing etchant selectively into the bore of the preform to adjust the ID.

In the processes of the invention, when the OD to ID ratio requires adjusting the easiest approach is to etch the ID since the ratio changes more rapidly as a result of ID etching. For example, if, the OD of the preform is 38.49 mm, and the ID is 4.44 mm (OD/ID 8.7), and the ratio desired is 7.7, this ratio can be reached by removing 4.3 mm of OD. To reach this ratio by etching the ID requires the removal of only 0.7 mm. Moreover, more than 50× more glass by volume must be removed to make the adjustment from the outside. Techniques for adjusting selected portions of the ID are described in conjunction with FIGS. 14 and 15.

Figure 14:
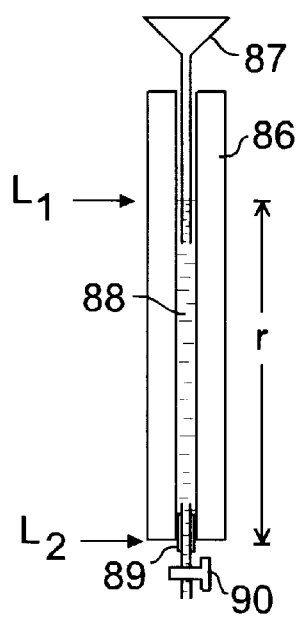
FIG. 14 is a schematic view of an apparatus designed for selective adjustment of ID dimensions along the length of the bore of the preform.
Figure 15:
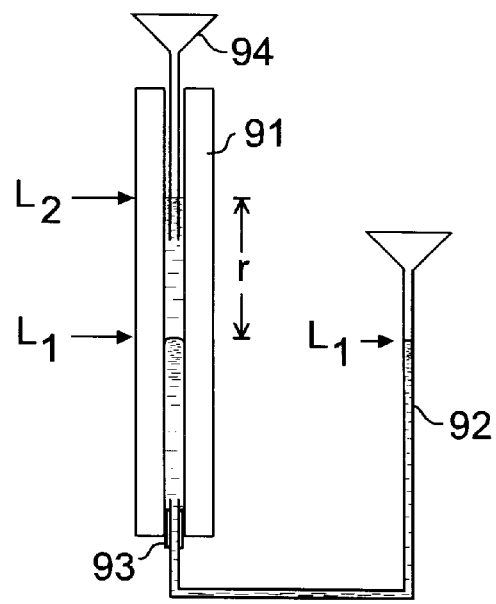
FIG. 15 is a schematic view of an apparatus similar to that of FIG. 14 modified to allow selective adjustment of ID dimensions in the middle of the bore of the preform.

With reference to FIG. 14, a preform 86 is shown with the lower portion of the bore, along the length designated r, extending from $L_1$ to $L_2$, having an ID requiring adjustment. Adjustment is achieved by selectively etching region r by introducing etchant 88 into the bore of the preform through funnel 87. The funnel has a long stem to prevent wetting of the bore at portions not being treated, i.e. above level $L_1$. The bottom of the bore is stoppered with stopper 89. The extent of etching can be tapered from $L_1$ to $L_2$ by slowly lowering the etching level by releasing etchant from the bottom of the bore using control means shown schematically at 90. If intermediate rinses are used the etchant is reintroduced into the bore after each rinse at a progressively lower level.

Figure 13:
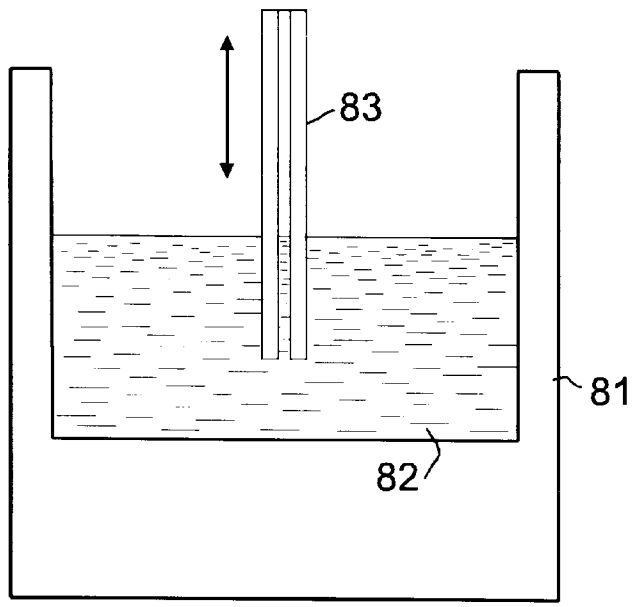
FIG. 13 is schematic view of another apparatus useful for adjusting the dimensions of the preform in selected regions.

In the selective etching technique described in conjunction with FIG. 13 etching proceeds from the end of the preform and the axial distance of etching along the length of the preform is determined by the extent of immersion of the preform in the etching bath. The region between the portion to be etched and the rest of the preform can be tapered by moving the preform vertically or changing the level of etching solution at some point during the etching process. By controlling the extent of immersion, and moving the preform during etching, the profile of the etched portion can be changed as desired.

Extruded preforms will occasionally have dimensional problems that occur toward the middle of the preform, i.e. the OD or ID may have an inflection point along the axial length. These problems may not be susceptible to treatment in the ways described above. A solution to this problem is described in connection with FIG. 15. Here the preform 91 is shown with a region r where selective etching of the ID is desired. The region r is n the middle of the preform and is bounded by levels indicated by $L_1$ and $L_2$. The preform is supported vertically and a dense fluid 92, e.g. Halocarbon oil #8 with a density of 1.6 g/cm$^3$, is introduced into the lower region of the bore of the preform to a level $L_1$. The lower end of the preform is stoppered with plug 93 and the dense oil is introduced through tube 94 to a level corresponding with $L_1$. With the oil meniscus at the proper height, etchant solution 95 is introduced by tube 96 into the top of the bore to a level corresponding with $L_2$ so that the depth of etchant in the bore corresponds with r, the region to be etched. The significant difference in density and the mutual insolubility of the oil and the etching solution prevents intermixing in the capillary and confines the etchant to the region r. The density of the lower fluid, the Halocarbon oil, in this example is approximately 20% greater than the density of the etchant. Other dense fluids can also be used for this function as long as the density of the fluid is significantly larger than the density of the etchant. Alternatively, both the oil and the etching solution an the apparatus of FIG. 15 may be introduced from the top of the container using funnels with long tubes in a manner similar to that shown in FIG. 14. Likewise the etching solution in the apparatus of FIG. 14 may be introduced from the bottom in the manner shown in FIG. 15.

Figure 16:
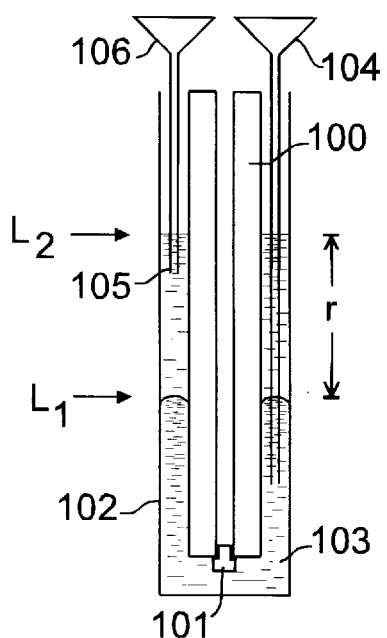
FIG. 16 is a schematic view of an apparatus suitable for selective adjustment of OD dimensions in the middle of the preform.

The technique just described is effective for selective etching the inside of bore 94. The technique can also be used for adjusting the OD independent of the ID by suspending etchant on the surface of a dense fluid outside and around the preform. This can be implemented using a tube in tube configuration as shown in FIG. 16. In FIG. 16, the tubular preform 100 is positioned within a tubular container 102. The bore of the preform is stoppered with stopper 101. The dense fluid 103 is introduced through funnel 104 to a level corresponding with $L_1$. The etchant solution 105 is introduced through funnel 106 to a level corresponding with $L_2$. Etching is effected as in the previous examples and removes material from the exterior surface of the preform 100 selectively along region designated r.

In the selective etching techniques described above the selected portion to be etched extends around the entire preform, i.e. the entire circumference at any point in the region to be treated is etched. The chemical machining technique of the invention can also be applied to selective etching of just a portion of the outer circumference of the preform to reduce or eliminate eccentricity and/or ellipticity (ovality) in the preform. Ferrule preforms as produced by the glass extruder may have eccentricity as high as 250 $\mu$m. This translates into ~16 $\mu$m in a 2.5 mm ferrule, and ~8 $\mu$m in a 1.25 mm ferrule. Tolerances for these components typically demand that variations do not exceed 2.5–3.0 $\mu$m for multimode fiber ferrule couplers, and 1 $\mu$m for single mode fiber ferrule couplers.

The eccentricity can be reduced using the apparatus of FIG. 10. In FIG. 10 the level of etching fluid is shown covering only the lower portion of the circumference of the preform. The circumferential portion of the preform being etched can be controlled using rollers 65 by using rocking movement up to preset angles.

Figure 17:
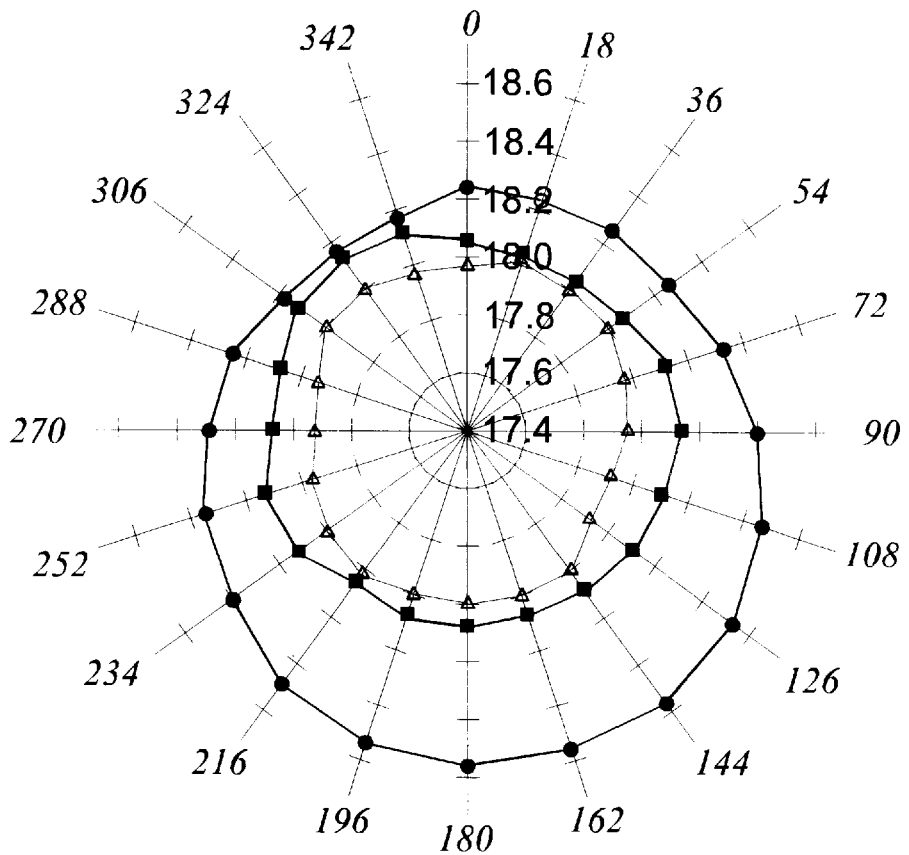
FIG. 17 is a plot of results of the application of chemical machining for reducing outside eccentricity in hollow bore preforms.

Results of this technique are shown in FIG. 17, which is a dimensional plot of one typical cross section of a sample preform in which the outside surface is treated to reduce eccentricity. When treating just the OD the bore can be stoppered. Curve 108 of FIG. 17 (circles) shows measurements of the circumference at one section of a typical preform prior to treatment. The italic numbers give the rotation angle, and the bold numbers give the wall thickness in mm. Curve 108 shows that the wall thickness of the preform prior to treatment varies from a minimum of approximately 18.2 mm near 324' to a maximum of approximately 18.6 mm near 144°. This 400 $\mu$m difference is called "siding" and it is generally equal to a double eccentricity. For the treatment described above, the preform is placed on the rollers with the 144° point down, and with the portion of the preform immersed in the etchant at 144°±40°. The rollers are operated so as to provide an additional 30° of rotation. Thus the portion of the circumference being treated is an arc extending from 74° to 214°. If the arc is designated A in degrees and the axial length of the preform is L then the portion of the preform etched can be defined as: ($\pi \times$OD$\times$L$\times$A)/360°.

After the etching treatment the circumference measurement is shown at 109 (squares) in FIG. 17. Now the maximum wall thickness is 18.12 mm at 72°, 252°, and 324°, and the minimum is 18.03 mm at 18° and 36°. The siding has been reduced to 90 $\mu$m. Further improvement in overall shape is obtained by etching the entire circumference of the preform, i.e. adjusting the rollers for rotation through 360°. The result of this treatment is shown by curve 110 (triangles) and shows a variation of wall thickness from 17.94 to 18.02 mm, for a siding of 80 $\mu$m. With ID approximately 5 mm, this preform has an OD of approximately 41 mm. The preform, when reduced to 1.25 mm OD ferrules by drawing, will result in a siding of the ferrule of only 2.5 $\mu$m (eccentricity: 1.25 $\mu$m) which is quite acceptable. Further treatment to adjust the OD/ID can be performed if necessary.

Figure 18:
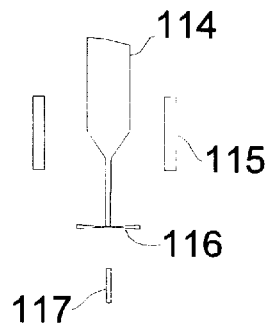
FIG. 18 is a schematic representation of an apparatus for drawing optical fiber and cutting the drawn fiber into ferrules.

In practicing this embodiment of the invention, i.e. reducing eccentricity, the rotational fraction of the preform exposed to the etching solution will be less than 360°. This controlled exposure can be accomplished by maintaining the immersion level of the preform well below the rotational angle to be exposed, i.e. below the horizontal diameter of the preform, and rocking the preform to expose the entire arc to be etched. Similar results can be obtained by adjusting the level of the etchant, or the depth of immersion of the preform, to expose the portion to be etched to the solution. As suggested above, the ferrules of the invention are conveniently produced by drawing an optical fiber from a preform made according to the invention and cutting appropriate lengths from the drawn fiber. An apparatus for doing this is shown schematically in FIG. 18, where the preform is shown at 114, and a drawing furnace is represented by heating element 115. The drawn fiber is cut into suitable lengths for ferrules 117 using an appropyiate cutting means represented by 116.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A method comprising the steps of drawing a glass tube from a cylindrical glass preform having a hollow cylindrical bore, said cylindrical bore and said glass preform being essentially concentric, and cutting the drawn tube into sections to form individual ferrules, wherein the improvement comprises, prior to said step of drawing a glass tube, etching at least a portion of said cylindrical bore with an etching solution to remove said portion of said cylindrical bore of said glass preform.

2. A method comprising the steps of drawing a glass tube from a tubular glass preform having an outside diameter $OD_1$ and an inside diameter $ID_1$, and cutting the drawn tube into sections to form individual tubular ferrules, wherein the improvement comprises, prior to said step of drawing a glass tube, etching a portion of said glass preform with an etching solution to reduce $OD_1$ to $OD_2$.

3. A method comprising the steps of drawing a glass tube from a tubular glass preform having an outside diameter $OD_1$ and an inside diameter $ID_1$, and cutting the drawn tube into sections to form individual tubular ferrules, wherein the improvement comprises, prior to said step of drawing a glass tube, etching said glass preform with an etching solution to increase $ID_1$ to $ID_2$.

4. A method comprising the steps of drawing a glass tube from a tubular glass preform having an outside diameter $OD_1$ and an inside diameter $ID_1$, and cutting the drawn tube into sections to form individual tubular ferrules, wherein the improvement comprises, prior to said step of drawing a glass tube, etching said glass preform with an etching solution to reduce $OD_1$ to $OD_2$ and increase $ID_1$ to $ID_2$.

5. The method of claim 4 wherein both $OD_1$ and $ID_1$ are etched simultaneously.

6. A method comprising the steps of drawing a glass tube from a tubular glass preform having an axial length L, and cutting the drawn tube into sections to form individual tubular ferrules, wherein the improvement comprises, prior to said step of drawing a glass tube, etching said glass preform with an etching solution by exposing a portion of the axial length L of said glass preform to said etching solution.

7. The method of claim 6 additionally including the step of plugging the tube.

8. A method comprising the steps of drawing a glass tube from a tubular glass preform having an outside diameter OD, an inside diameter ID, and an axial length L, and cutting the drawn tube into sections to form individual tubular ferrules, wherein the improvement comprises, prior to said step of drawing a glass tube, etching said glass preform with an etching solution by mounting said preform in said etching solution with said axial length L horizontal and with said glass preform at least partially immersed in said etching solution.

9. The method of claim 8 in which the glass preform is rotated during etching.

10. The method of claim 8 in which the glass preform is fully immersed in the etching solution during etching, and the OD of the glass preform is reduced during etching.

11. The method of claim 8 in which the glass preform is partially immersed in the etching solution during etching.

12. The method of claim 8 in which the glass preform is partially immersed in the etching solution and the glass preform is rotated through 360°.

13. The method of claim 8 in which the glass preform is partially immersed in the etching solution and the glass preform is rotated through an arc A in degrees of less than 360°, to remove a portion of the OD of the preform in a region defined by $(\pi \times OD \times L \times A)/360°$.

14. A method comprising the steps of drawing a glass tube from a tubular glass preform having an outside diameter OD, an inside diameter ID, and an axial length L, and cutting the drawn tube into sections to form individual tubular ferrules, wherein the improvement comprises, prior to said step of drawing a glass tube, etching said glass preform with an etching solution by mounting said glass preform in the etching solution with said axial length L vertical and with said glass preform at least partially immersed in said etching solution.

15. The method of claim 14 in which said glass preform is plugged to prevent exposure of the ID of said glass preform to the etching solution.

16. A method comprising the steps of drawing a glass tube from a glass preform having an axial bore, an outside diameter OD, an inside diameter ID, and an axial length L, and cutting the drawn tube into sections to form individual tubular ferrules, wherein the improvement comprises, prior to said step of drawing a glass tube, etching at least a portion of the ID of said glass preform with an etching solution by mounting said glass preform with said axial length L vertical, introducing a fluid into said axial bore to fill a first portion $L_1$ of said axial bore, and introducing an etching solution into said axial bore to fill a second portion $L_2$ of said axial bore where $L_1 + L_2 < L$, whereby the ID of said second portion of said axial bore is etched.

17. The method of claim 16 in which said etching solution and said fluid are mutually essentially insoluble.

18. A method comprising the steps of drawing a glass tube from a glass preform having an axial bore, an outside diameter OD, an inside diameter ID, and an axial length L, and cutting the drawn tube into sections to form individual tubular ferrules, wherein the improvement comprises, prior to said step of drawing a glass tube, etching at least a portion of the OD of said glass preform with an etching solution by mounting said glass preform in a fluid container with said axial length L vertical, introducing a fluid into said container to cover a first portion $L_1$ of said axial length L of said glass preform, and introducing an etching solution into said container to cover a second portion $L_2$ of said axial length $L_1$ of said glass preform where $L_1 + L_2 < L$, whereby said second portion of the OD of said glass preform is etched.

19. A method comprising the steps of drawing a glass tube from a tubular glass preform having an outside diameter OD, an inside diameter ID, and an axial length L, and cutting the drawn tube into sections to form individual tubular ferrules, wherein the improvement comprises, prior to said step of drawing a glass tube, etching said glass preform with an etching solution by mounting said glass preform in said etching solution with said axial length L vertical and with said glass preform at least partially immersed in said etching solution.

* * * * *